United States Patent
Burch et al.

(10) Patent No.: US 8,621,961 B2
(45) Date of Patent: Jan. 7, 2014

(54) MULTI-PURPOSE TOOL

(75) Inventors: Wade Burch, Wauwatosa, WI (US); Michael S. Steele, Waukesha, WI (US); Jason R. Crowe, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 420 days.

(21) Appl. No.: 12/769,113

(22) Filed: Apr. 28, 2010

(65) Prior Publication Data

US 2010/0269263 A1 Oct. 28, 2010

Related U.S. Application Data

(60) Provisional application No. 61/173,460, filed on Apr. 28, 2009.

(51) Int. Cl.
| | |
|---|---|
| *B25B 13/48* | (2006.01) |
| *B25B 15/00* | (2006.01) |
| *B25B 23/00* | (2006.01) |
| *B25B 23/08* | (2006.01) |
| *B25B 23/10* | (2006.01) |
| *H02G 1/12* | (2006.01) |
| *B25F 1/00* | (2006.01) |
| *B25B 25/00* | (2006.01) |

(52) U.S. Cl.
USPC .............. 81/9.4; 81/436; 81/451; 81/460; 81/461; 7/107; 7/108

(58) Field of Classification Search
USPC ........ 7/107, 108; 81/441, 442, 436, 451, 430, 81/461, 9.4
See application file for complete search history.

(56) References Cited

U.S. PATENT DOCUMENTS

| | | | |
|---|---|---|---|
| 686,424 | A | 11/1901 | Smith |
| 789,941 | A | 5/1905 | Sibley |
| 1,371,965 | A | 3/1921 | York |
| 1,910,182 | A | 5/1933 | Robertson |
| 1,965,917 | A | 7/1934 | Anderholm |
| 2,046,837 | A | 7/1936 | Phillips |
| 2,082,748 | A | 6/1937 | Brown |
| 2,141,072 | A | 12/1938 | Velepec |
| 2,173,707 | A | 9/1939 | Brown |

(Continued)

FOREIGN PATENT DOCUMENTS

| | | |
|---|---|---|
| EP | 0744251 | 11/1996 |
| GB | 403769 | 1/1934 |
| GB | 1392360 | 4/1975 |

OTHER PUBLICATIONS

Extended European Search Report for Application No. 10739182.3 dated May 10, 2012 (4 pages).

(Continued)

*Primary Examiner* — Monica Carter
*Assistant Examiner* — Danny Hong
(74) *Attorney, Agent, or Firm* — Michael Best & Friedrich LLP

(57) ABSTRACT

A tool handle includes a handle body having a first end, a second end, an exterior surface and a bore configured to receive a shaft. A wire stripper is integrated into the exterior surface of the handle and configured to cut and remove the insulating layer of a conductive wire. The wire stripper includes a first sharp edge and a second sharp edge intersecting the first sharp edge to form a v-shaped notch.

19 Claims, 4 Drawing Sheets

(56) References Cited

U.S. PATENT DOCUMENTS

| | | | |
|---|---|---|---|
| 2,216,381 A | 10/1940 | West et al. | |
| 2,400,684 A | 5/1946 | Clark | |
| 2,546,489 A * | 3/1951 | Wright | 7/108 |
| 2,600,924 A | 6/1952 | Royer et al. | |
| 2,641,478 A | 6/1953 | Sigg | |
| 2,658,766 A | 11/1953 | Rock | |
| 2,770,989 A * | 11/1956 | Bologno | 30/90.1 |
| 2,807,810 A * | 10/1957 | Belek et al. | 7/107 |
| D196,289 S | 9/1963 | Losh | |
| 3,114,277 A * | 12/1963 | Clendenin | 30/90.1 |
| 3,114,401 A | 12/1963 | Johnson | |
| 3,253,286 A * | 5/1966 | Bacon | 7/108 |
| 3,396,765 A | 8/1968 | Ridenour | |
| 3,424,212 A | 1/1969 | Kemper | |
| 3,452,373 A | 7/1969 | Vosbikian et al. | |
| 3,674,070 A | 7/1972 | Mahoney | |
| 3,888,144 A | 6/1975 | Parsons | |
| 3,891,017 A | 6/1975 | Iskra | |
| 3,985,170 A | 10/1976 | Iskra | |
| 4,064,581 A | 12/1977 | Kober | |
| 4,089,357 A | 5/1978 | Gill | |
| 4,149,434 A | 4/1979 | Wilson | |
| 4,257,159 A * | 3/1981 | Wingert | 29/861 |
| 4,325,153 A | 4/1982 | Finnegan | |
| 4,328,721 A | 5/1982 | Massari | |
| 4,448,097 A | 5/1984 | Rocca | |
| 4,464,957 A | 8/1984 | Gill | |
| 4,466,315 A | 8/1984 | Boschetto, Jr. et al. | |
| 4,488,462 A | 12/1984 | Wall | |
| 4,526,071 A | 7/1985 | Post | |
| 4,528,874 A | 7/1985 | Dunn | |
| 4,779,493 A | 10/1988 | White | |
| 4,867,018 A | 9/1989 | Spector | |
| 5,214,987 A | 6/1993 | Fenton, Sr. | |
| 5,245,721 A * | 9/1993 | Lowe et al. | 7/129 |
| 5,287,778 A | 2/1994 | Cook | |
| 5,353,667 A | 10/1994 | Wilner | |
| 5,358,368 A | 10/1994 | Conlan et al. | |
| 5,450,775 A | 9/1995 | Kozak | |
| 5,528,966 A | 6/1996 | Coppejans | |
| D371,947 S | 7/1996 | Mellinger | |
| 5,533,429 A | 7/1996 | Kozak | |
| 5,660,091 A | 8/1997 | Stone et al. | |
| 5,749,271 A | 5/1998 | Liu | |
| 5,779,404 A | 7/1998 | Jore | |
| 5,785,468 A | 7/1998 | Peritz | |
| D405,672 S | 2/1999 | Wirths | |
| 5,894,765 A | 4/1999 | Anderson et al. | |
| 5,901,622 A | 5/1999 | Sweeny | |
| 5,904,080 A | 5/1999 | Anderson et al. | |
| 5,904,081 A | 5/1999 | Cushman et al. | |
| 5,910,197 A | 6/1999 | Chaconas | |
| 5,954,463 A | 9/1999 | Jore | |
| 5,956,789 A * | 9/1999 | Chou | 7/108 |
| 6,016,728 A | 1/2000 | Bohl | |
| 6,082,232 A | 7/2000 | Anderson et al. | |
| 6,119,561 A | 9/2000 | Anderson et al. | |
| 6,120,363 A | 9/2000 | Dunn | |
| 6,128,983 A | 10/2000 | Arnn | |
| 6,182,541 B1 | 2/2001 | Anderson et al. | |
| 6,202,512 B1 | 3/2001 | O'Brien et al. | |
| 6,209,428 B1 | 4/2001 | Anderson et al. | |
| 6,223,634 B1 | 5/2001 | Hughes et al. | |
| 6,244,142 B1 | 6/2001 | Swanson | |
| 6,257,106 B1 | 7/2001 | Anderson et al. | |
| 6,260,453 B1 | 7/2001 | Anderson et al. | |
| 6,260,980 B1 | 7/2001 | Ping | |
| 6,286,400 B1 | 9/2001 | Anderson et al. | |
| 6,289,775 B1 | 9/2001 | Wei | |
| 6,298,756 B1 | 10/2001 | Anderson et al. | |
| 6,302,632 B1 | 10/2001 | Lin | |
| 6,305,256 B1 | 10/2001 | Anderson et al. | |
| 6,318,218 B1 | 11/2001 | Anderson et al. | |
| 6,341,546 B1 | 1/2002 | Totsu | |
| D453,289 S | 2/2002 | Campbell | |
| 6,352,010 B1 | 3/2002 | Giarritta et al. | |
| 6,354,177 B2 | 3/2002 | Peters | |
| 6,363,560 B1 | 4/2002 | Kesinger | |
| 6,374,711 B2 | 4/2002 | Anderson et al. | |
| 6,378,406 B1 | 4/2002 | Totsu | |
| 6,398,785 B2 | 6/2002 | Carchidi et al. | |
| 6,408,723 B1 | 6/2002 | Zurbuchen | |
| 6,425,307 B1 | 7/2002 | Chen | |
| 6,494,121 B1 | 12/2002 | Hu | |
| 6,601,482 B2 | 8/2003 | Hughes et al. | |
| 6,626,071 B2 | 9/2003 | Kesinger et al. | |
| 6,655,243 B2 | 12/2003 | Anderson et al. | |
| 6,705,183 B1 | 3/2004 | Dickens | |
| 6,761,361 B2 | 7/2004 | Taylor et al. | |
| 6,792,838 B2 | 9/2004 | Brooks et al. | |
| 6,813,978 B1 | 11/2004 | Karpp | |
| 6,826,831 B2 | 12/2004 | Crawley | |
| 6,978,504 B1 | 12/2005 | Smith et al. | |
| 6,988,432 B2 | 1/2006 | Brooks | |
| 7,028,592 B2 | 4/2006 | Hills | |
| 7,052,128 B1 | 5/2006 | Kung-Ping | |
| 7,114,418 B1 | 10/2006 | Allen | |
| 7,162,939 B2 | 1/2007 | Totsu | |
| 7,207,248 B2 | 4/2007 | Panasik et al. | |
| 7,225,490 B1 * | 6/2007 | Yen | 7/107 |
| 7,225,710 B2 | 6/2007 | Pacheco, Jr. | |
| 7,255,028 B2 | 8/2007 | Di Bitonto et al. | |
| 7,290,470 B1 | 11/2007 | Peters | |
| 7,325,470 B2 | 2/2008 | Kay et al. | |
| 2002/0170394 A1 | 11/2002 | Tsai | |
| 2005/0166724 A1 | 8/2005 | Castaneda | |
| 2005/0172761 A1 | 8/2005 | Brooks | |
| 2006/0130621 A1 | 6/2006 | Novak et al. | |
| 2006/0230887 A1 | 10/2006 | Taguchi | |
| 2007/0215234 A1 | 9/2007 | Poole | |
| 2008/0184852 A1 | 8/2008 | Peters | |
| 2008/0226423 A1 | 9/2008 | Brooks | |
| 2009/0139379 A1 | 6/2009 | Chiang et al. | |

OTHER PUBLICATIONS

PCT/US2010/023361 International Search Report and Written Opinion dated Apr. 14, 2010 (11 pages).

* cited by examiner

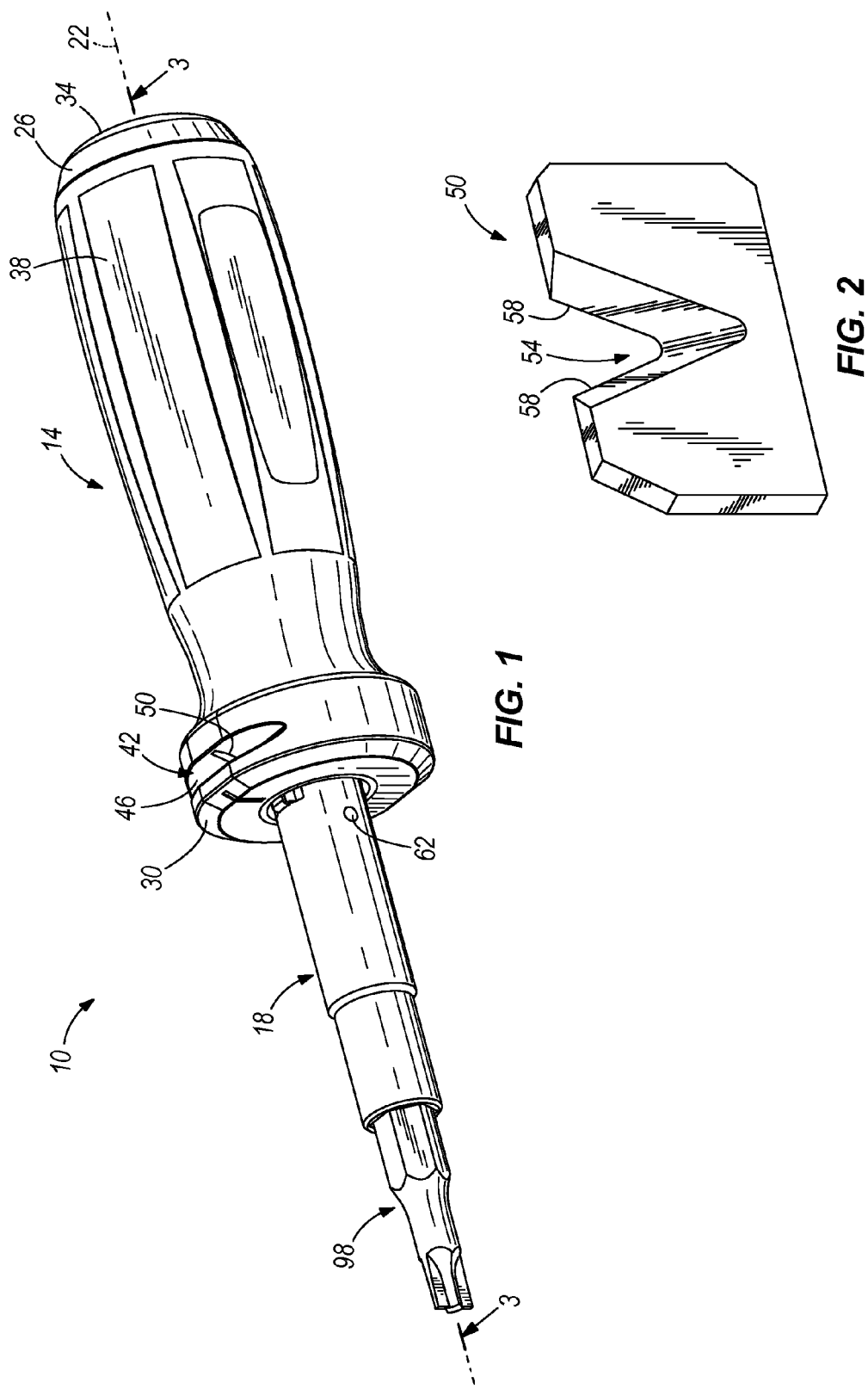

MULTI-PURPOSE TOOL

CROSS-REFERENCE TO RELATED PATENT APPLICATION

This application claims priority to U.S. Provisional Patent Application No. 61/173,460, filed Apr. 28, 2009, the entire contents of which is incorporated by reference herein.

BACKGROUND

The present invention relates to a hand tool, and in particular, a combination tool for use with a variety of tasks and fastener types.

Phillips, flat-head, hex, Torx, and Robertson are well-known fastener drive types. On a given job site, a worker may encounter any combination of these fastener drive types, and others, in a variety of sizes. Furthermore, fasteners of these types may be associated with a variety of tasks. For an electrician, those tasks may include wire-stripping and other wire-related tasks.

SUMMARY

In one embodiment, the invention provides a multi-purpose tool. The multi-purpose tool includes a handle body having a first end, a second end, an exterior surface and a bore configured to receive a shaft. A wire stripper is integrated into the exterior surface of the handle and configured to cut and remove the insulating layer of a conductive wire. The wire stripper includes a first sharp edge and a second sharp edge intersecting the first sharp edge to form a v-shaped notch.

In another embodiment, the invention provides a multi-purpose tool. The multi-purpose tool includes a handle having a first end, a second end, an exterior surface and an axis extending from the first end to the second end. A wire-stripper insert is coupled to the handle and configured for stripping an insulating layer from a metallic wire. A shaft extends from the first end along the axis and is coupled to the handle such that a torque applied to the handle may be transmitted to the shaft. The shaft includes an aperture configured to receive the end portion of a metallic wire in order to form a wire loop. A bit configured for driving a threaded fastener is coupled to an end of the shaft.

In yet another embodiment, the invention provides a multi-purpose tool. The multi-purpose tool includes a handle having a handle axis, a first end at a first axial position, a second end at a second axial position, an exterior surface, and a central cavity extending inwardly along the handle axis from the second end toward the first end. A wire-stripping insert is coupled to the exterior surface of the handle and configured to penetrate and remove a section of an insulating jacket from a conductive wire. A shaft has a shaft axis and includes a first bore extending along the shaft axis from a first end of the shaft. The first bore has a first hexagonal profile. A second bore extends along the shaft axis from a second end of the shaft. The second bore has a second hexagonal profile. A coupling section is positioned intermediate the first bore and the second bore. A first aperture configured for forming a loop in an end portion of a metallic wire is positioned intermediate the coupling section and the first end of the shaft. A second aperture configured for forming a loop in an end portion of a metallic wire is positioned intermediate the retention section and the second end of the shaft. The shaft axis is coaxial with the handle axis when the shaft is coupled to the handle within the central cavity.

Other aspects of the invention will become apparent by consideration of the detailed description and accompanying drawings.

BRIEF DESCRIPTION OF THE DRAWINGS

FIG. 1 is a perspective view of a multi-purpose tool according to one aspect of the invention.

FIG. 2 is a perspective view of a stripping insert of a handle of the multi-purpose tool of FIG. 1.

Figure 3:
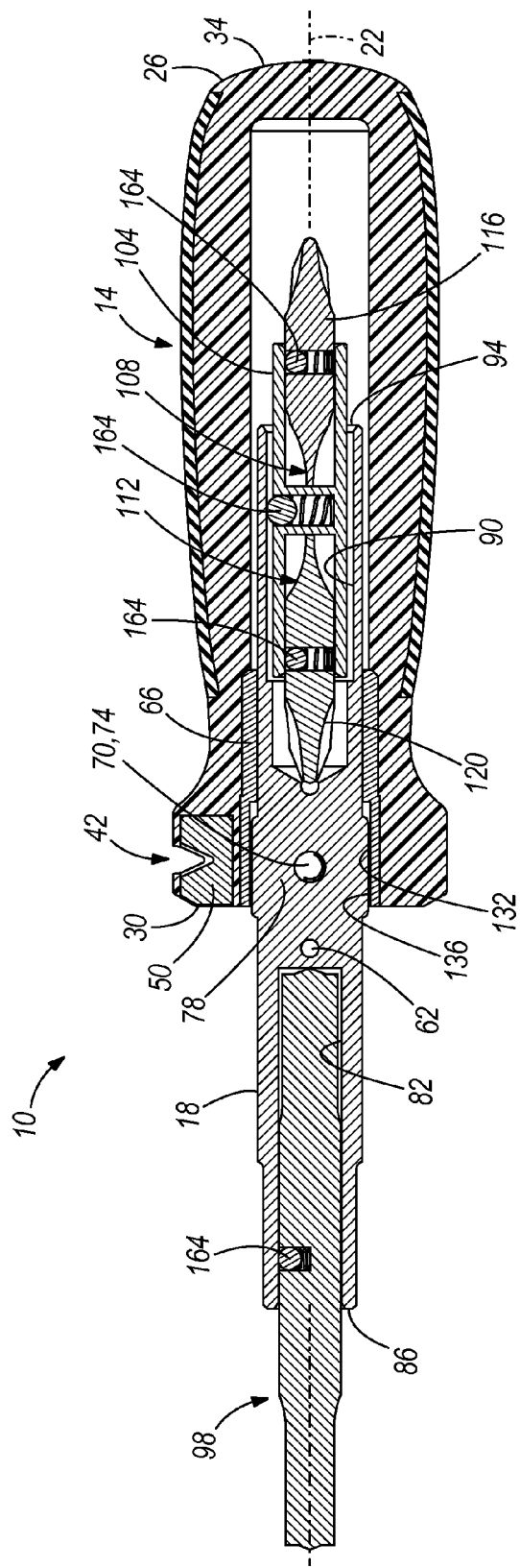
FIG. 3 is a cross-sectional view of the multi-purpose tool taken along line 3-3 of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

FIG. 1 illustrates a multi-purpose tool 10 according to one embodiment of the invention. The multi-purpose tool 10 includes a handle 14 and a shaft 18 oriented along a longitudinal axis 22. The handle has a first end 26 and a second end 30. A rounded pommel 34 is formed at the first end 26 of the handle 14. The shaft 18 projects outwardly from the second end 30 of the handle 14. The handle 14 also includes gripping surfaces 38 for a user such that the user may grip the handle 14 for the tightening and loosening of a fastener, such as a screw. In the illustrated embodiment, the handle 14 is detachably coupled to the shaft 30, though in other constructions that embody various features of the invention, the shaft may be fixedly coupled to the handle.

In the illustrated embodiment, the handle 14 includes a wire-stripper 42. Adjacent the second end 30, a u-shaped channel 46 is formed in the handle 14. A stripping insert 50 is fixedly coupled to the handle 14 within the u-shaped channel 46. As illustrated in FIG. 2, the stripping insert 50 is formed from a sheet of hardened metal, such as a steel alloy. The stripping insert 50 has a v-notch 54 formed by a pair of intersecting edge surfaces 58. When the stripping insert 50 is coupled with the handle 14, the v-notch 54 of the stripping insert 50 aligns with the u-shaped channel 46 of the handle 14. In some constructions, the stripping insert 50 may be permanently molded or pressed into the u-shaped channel 46. In other embodiments, the stripping insert 50 may be detachably coupled to the handle 14, and therefore replaceable. Where the stripping insert 50 is detachably coupled, it may be retained within the handle by a set screw, friction fit, resilient tab, or other means.

In many applications, it may be desirable to form a wire loop in the exposed end portion of the wire, such as when connecting the wire to an electrical terminal. The shaft 18 is provided with loop-maker in the form of an aperture 62 oriented perpendicular to the axis 22. Operation of the wire-stripper 42 and aperture 62 are described below in regard to FIG. 5.

As illustrated in FIG. 3, the multi-purpose tool 10 includes a coupling insert 66 affixed within the handle 14. The shaft 18 is selectively, detachably held within the coupling insert 66. The coupling insert 66 allows for torque transmission between the handle 14 and the detachable shaft 18. A spring and ball-detent assembly 70 within the shaft 18 detachably secures the shaft 18 within the coupling insert 66. The spring and ball-detent assembly 70 is located substantially adjacent a midpoint 74 of the shaft along the axis 22, within a solid center 78 of the shaft 18.

The shaft 18 includes a first bit chamber 82 at a first end 86 and a second bit chamber 90 at a second end 94. Thus, the first bit chamber 82 and the second bit chamber 90 are on axially opposing ends of the solid center 78. In the illustrated embodiment, the first bit chamber 82 holds a first double ended combination head bit 98. The second bit chamber 90 holds an intermediate sleeve 104. The intermediate sleeve 104 includes a first sub-chamber 108 and a second sub-chamber 112. Each sub-chamber houses one of a second double ended bit 116 and a third double ended bit 120.

Figure 4:
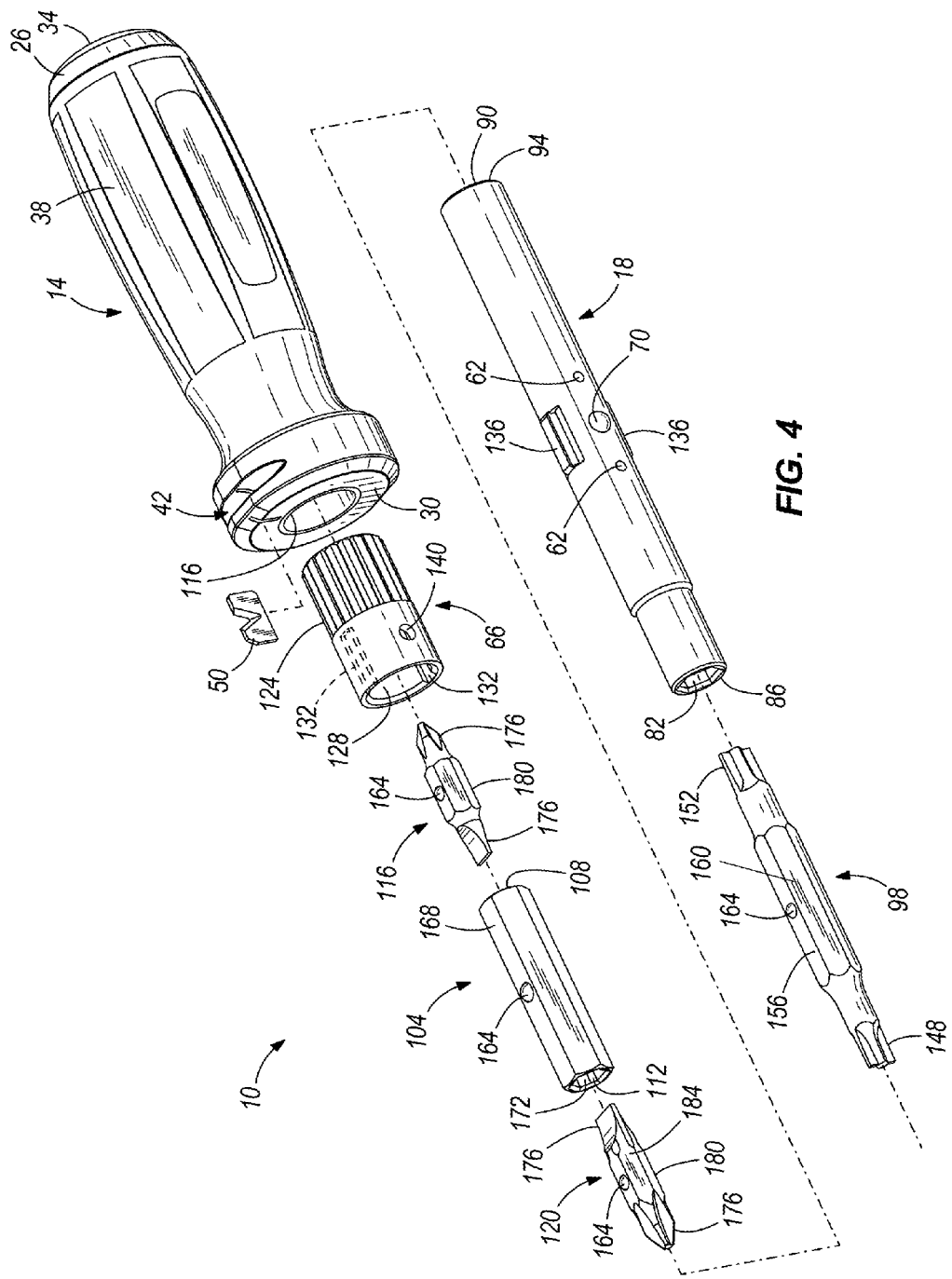
FIG. 4 is an exploded view of the multi-purpose tool of FIG. 1.

FIG. 4 is an exploded view of the multi-purpose tool 10, illustrating various additional features of the shaft 18, the coupling insert 66, the intermediate sleeve 104 and the double ended bits 98, 116 and 120. As illustrated in FIG. 4, the coupling insert 66 has an external male spline 124. The external male spline 124 mates with a corresponding female spline formed inside of the handle 14. In some embodiments, the handle 14 may be injection molded or cast directly over the coupling insert 66, thereby directly forming the female spline on the male spline 124. In other embodiments, the handle 14 may be press fit or adhesively bonded over the coupling insert 66.

A central aperture 128 of the coupling insert 66 includes a pair of radially opposed relief channels 132. The relief channels 132 are configured to receive a pair of opposing tabs 136 of the shaft 18, described below. A pair of opposing detents 140 are configured and located to align with the spring and ball detent assembly 70 of the shaft 18 when the shaft 18 is fully seated in the coupling insert 66, such as is illustrated in FIG. 3. Two detents 140 are provided so that the shaft 18 may be inserted into the coupling insert 66 in either of two orientations when the shaft 18 is inserted from either of two ends 86 or 94.

The coupling insert 66 may be cast, machined or otherwise formed from steel or other high strength materials. In other embodiments, a coupling insert may be integrally formed into a handle made entirely of steel or other high strength material.

In the illustrated embodiment, the shaft 18 is reversible in the sense that either the first end 86 or the second end 94 may be received by the coupling insert within the handle. A pair of opposed tab members 136 extend outwardly from the solid center 78 of the shaft 18. The opposed tab members 136 are configured to be slidingly received within the relief channels 132 of the coupling insert 66. When fully inserted within the relief channels 132, the tab members 136 provide for torque transmission from the handle 14 to the coupling insert 66 to the shaft 18 and, ultimately, from a bit to the head of a fastener.

In the illustrated embodiment, the loop-making aperture 62 described in regard to FIG. 1 is actually one of two such apertures. One loop-making aperture 62 is provided on axially opposed ends of the solid center 78. Therefore, one loop-making aperture 62 is available regardless of which end 86 or 94 of the shaft 18 is coupled to the handle 14.

The first bit chamber 82 and second bit chamber 90 each have hexagonal internal profiles 144. In the illustrated embodiment, the first bit chamber 82 is sized and configured to engage a 5/16 inch (7.9375 mm) hexagonal fastener head, such as a nut or bolt. In the illustrated embodiment, the second bit chamber 90 is sized and configured to engage a 3/8 inch (9.5250 mm) hexagonal fastener head, such as a nut or bolt. In other embodiments, the first bit chamber 82 and/or second bit chamber 90 may have various other internal configurations and sizes. Examples may include square or 12-point profiles, or sizes for engaging metric fasteners of these and other configurations.

FIGS. 3 and 4 also illustrate the first double ended bit 98 according to one embodiment of the invention. The illustrated first double ended bit is disclosed in co-pending U.S. patent application Ser. No. 12/701,370, entitled "SCREWDRIVER," filed Feb. 5, 2010, and incorporated by reference herein. The first double ended bit 98 includes a first driving head portion 148, a second driving head portion 152, and a shank 156 that connects the two driving head portions. In the illustrated embodiment, the driving head portions 148 and 152 are integrally formed as one piece at opposite ends of the shank 156. The shank 156 has a hexagonal profile 160 configured to slidably mate with the 5/16 inch (7.9375 mm) hexagonal profile of the first bit chamber 82. The shank 156 may be of various lengths depending on the end-use. A spring and ball detent assembly 164 is located at or near a midpoint of the shank portion. The spring and ball detent assembly 164 is configured to engage the walls of the first bit chamber for a friction fit. In other embodiments, the ball may engage a corresponding recess of the first bit chamber 82.

As shown in FIGS. 3 and 4, the intermediate sleeve 104 has a hexagonal outer profile 168 sized to slidably engage the 3/8 inch (9.5250 mm) hexagonal profile of the second bit chamber 90. A spring and ball detent arrangement 164, similar to that of the first double ended bit 98, is provided to engage the wall of the second bit chamber 90 for a friction fit. In the illustrated embodiment, both the first sub-chamber 108 and the second sub-chamber 112 have a hexagonal internal profile 172 sized and configured to engage a 1/4 inch (6.3500 mm) hexagonal fastener head.

The second double ended bit 116 and third double ended bit 120 each have a pair of opposing driving head portions 176 on opposite ends of a shank 180. The shanks 180 of both the second double ended bit 116 and the third double ended bit 120 have a 1/4 inch (6.3500 mm) hexagonal profile 184 to engage the sub-chambers 108 and 112 of the intermediate sleeve 104. The shanks 180 each have a spring and ball detent assembly 164 for engaging the walls of the sub chambers 108 and 112 in a friction fit.

Although the shaft 18 and intermediate sleeve 104 are described herein as having particular sizes and configurations, one of ordinary skill in the art will recognize that these sizes are exemplary. Furthermore, each driving head portion of the first double ended bit 98, second double ended bit 116, and third double ended bit 120 may have various sizes and configurations. Examples of different driving head configurations known in the art may include slotted, Phillips, Torx, Robertson, Pozi-Driv, hex (i.e., Allen) and others including combination types. Driving heads for the various known tamper-resistant fastener types may also be provided.

Each of the shaft, the intermediate sleeve and bits may undergo various heat treatment, surface hardening, plating or coating processes to optimize the hardness, toughness, wear resistance, or corrosion resistance of the tool.

Figure 5:
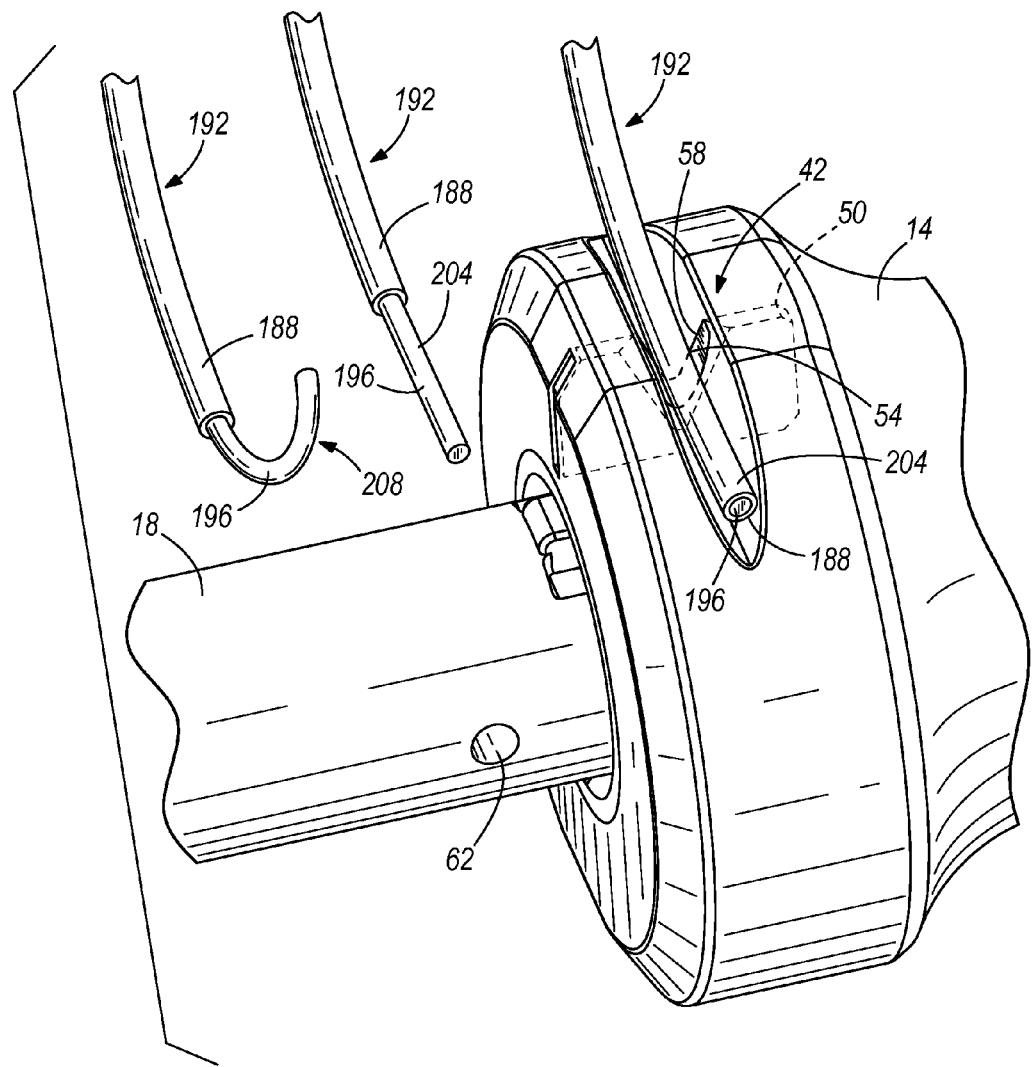
FIG. 5 is a partial perspective view of the multi-purpose tool of FIG. 1.

FIG. 5 illustrates one use for the multi-purpose tool 10. In operation, a user uses the wire-stripper 42 to strip a portion of an insulating jacket 188 from an electrical wire 192 in order to expose the conductor 196. An end portion 204 of the wire 192 is pressed into the v-notch 54 of the stripping insert 50 such that the edge surfaces 58 penetrate the outer insulating jacket 188 of the wire. When the user draws the wire out of the stripping insert, the insulating jacket is separated, thereby exposing the conductor 196 at the end portion 204 of the wire. For many uses, it may be desirable to form a loop 208 in the end portion 204 of the wire. A user may insert the exposed conductor 196 at the end portion 204 of the wire into the aperture 62. With a twist or rotation of the shaft 18 (via rotation of the handle 14) a useful wire loop 208 is formed.

Thus, the invention provides, among other things, a tool for driving combination-head threaded fasteners. Various features and advantages of the invention are set forth in the following claims.

What is claimed is:

1. A multi-purpose tool comprising:
a handle body having a first end, a second end, an exterior surface and a bore configured to receive a shaft along a longitudinal axis, the exterior surface including a channel that is nonintersecting with the longitudinal axis; and
a wire stripper integrated into the exterior surface of the handle and configured to cut and remove the insulating layer of a conductive wire, the wire stripper including
a first sharp edge;
a second sharp edge intersecting the first sharp edge to form a v-shaped notch disposed within the channel.

2. The multi-purpose tool of claim 1, wherein the first sharpened edge and the second sharp edge are formed as one in a substantially planar insert of the wire stripper.

3. The multi-purpose tool of claim 2, wherein the substantially planar insert is formed from a hardened steel alloy.

4. The multi-purpose tool of claim 2, wherein the substantially planar insert is molded into the handle body.

5. The multi-purpose tool of claim 2, wherein the substantially planar insert is detachably coupled to the handle body.

6. A multi-purpose tool, comprising:
a handle having a first end, a second end, an exterior surface and a central axis extending from the first end to the second end, the exterior surface including a u-shaped channel that is nonintersecting with the central axis;
a wire-stripper insert integrated into the exterior surface of the handle and at least partially disposed within the u-shaped channel, the wire stripper insert configured for stripping an insulating layer from a metallic wire;
a shaft extending from the first end along the axis and coupled to the handle such that a useful torque applied to the handle may be transmitted to the shaft, the shaft including an aperture configured to receive the end portion of a metallic wire in order to form a useful wire loop; and
a bit configured for driving a threaded fastener coupled to a distal end of the shaft.

7. The multi-purpose tool of claim 6, wherein the wire stripper insert comprises a substantially planar member with a v-shaped notch formed by intersecting edge surfaces.

8. The multi-purpose tool of claim 7, wherein the v-shaped notch of the wire-stripping insert is centered within the u-shaped channel on the exterior surface of the handle.

9. The multi-purpose tool of claim 6, wherein the wire-stripping insert is permanently bonded within the u-shaped channel.

10. The multi-purpose tool of claim 6, wherein the wire-stripping insert is detachable and replaceable.

11. A multi-purpose tool comprising:
a handle having a handle axis, a first end at a first axial position, a second end at a second axial position, an exterior surface, and a central cavity extending inwardly along the handle axis from the second end toward the first end, the exterior surface including a non-enclosed channel that is nonintersecting with the handle axis;
a wire-stripping insert integrated into the exterior surface of the handle and at least partially disposed within the non-enclosed channel, the wire stripper insert configured to penetrate and remove a section of an insulating jacket from a conductive wire; and
a shaft having a shaft axis and comprising:
a first bore extending along the shaft axis from a first end of the shaft, the first bore having a first hexagonal profile;
a second bore extending along the shaft axis from a second end of the shaft, the second bore having a second hexagonal profile;
a coupling section positioned intermediate the first bore and the second bore;
a first aperture configured for forming a loop in an end portion of a metallic wire, the first aperture positioned intermediate the coupling section and the first end of the shaft; and
a second aperture configured for forming a loop in an end portion of a metallic wire, the second aperture positioned intermediate the coupling section and the second end of the shaft,
wherein the shaft axis is coaxial with the handle axis when the shaft is coupled to the handle within the central cavity.

12. The multi-purpose tool of claim 11, further comprising a coupling insert fixedly coupled within the cavity and configured for detachably, reversibly coupling the shaft to the handle such that one of the first bore and the second bore extends outwardly from the handle along the axis.

13. The multi-purpose tool of claim 12, wherein the coupling insert includes a pair of opposing channels configured to receive a pair of opposing tab members extending from the coupling section of the shaft.

14. The multi-purpose tool of claim 13, wherein the shaft includes a ball-detent assembly and the coupling insert includes a detent aperture configured to engaged the ball-detent assembly.

15. The multi-purpose tool of claim 11, wherein the wire-stripping insert is centered within the non-enclosed channel on the exterior surface of the handle.

16. The multi-purpose tool of claim 15, wherein the wire-stripping insert is permanently bonded within the non-enclosed channel.

17. The multi-purpose tool of claim 11, wherein the wire-stripping insert is detachable and replaceable.

18. The multi-purpose tool of claim 11, further comprising an intermediate sleeve having a hexagonal outer profile configured to slidably engage the first bore of the shaft and a pair of chambers having a hexagonal inner profile configured to receive a first detachable tool bit and a second detachable tool bit.

19. The multi-purpose tool of claim 11, wherein the first aperture and the second aperture are substantially normal to the axis.

* * * * *